United States Patent Office 3,067,186
Patented Dec. 4, 1962

3,067,186
VINYL CHLORIDE POLYMERISATION
PROCESS
Kenneth Henry Charles Bessant, Banstead, and Richard John Strachan Matthews, Great Bookham, England, assignors to The Distillers Company Limited, Edinburgh, Scotland, a British company
No Drawing. Filed May 24, 1960, Ser. No. 31,271
Claims priority, application Great Britain July 11, 1959
9 Claims. (Cl. 260—92.8)

The present invention relates to the polymerisation of vinyl chloride at low temperatures below 0° C.

It has been discovered that if the polymerisation of vinyl chloride is carried out at comparatively low temperatures a form of polyvinyl chloride is obtained which has a higher density and higher softening point than the previously available polyvinyl chlorides which had been prepared at higher temperatures.

An object of the present invention is to provide an improved process for the polymerisation of vinyl chloride at low temperatures. A further object is to provide a process for the copolymerisation of vinyl chloride with other monomers at low temperatures.

Accordingly the present invention comprises polymerising vinyl chloride at a temperature in the range $-14°$ C. to $-60°$ C. in the presence of redox polymerisation catalyst comprising methyl hydroperoxide, a compound of iron capable of producing ferrous ions in the reaction medium and ascorbic acid.

The polymerisation is preferably carried out in an aqueous medium in which the vinyl chloride or monomer mixture containing it is dispersed provided that a sufficient quantity of an "antifreeze" ingredient is present to prevent the reaction mixture freezing. Suitable antifreeze ingredients are the lower monohydric alcohols, such as methyl or ethyl alcohol, and polyhydric alcohols, such as glycol and glycerol. When the polymerisation is carried out in a heterogeneous system containing water it is perferable to add an efficient emulsifying agent to the system in order to maintain the monomers and the produced polymers in a finely divided, dispersed condition throughout the period of polymerisation.

The process of the present invention can also be carried out under homogeneous conditions, i.e. with the vinyl chloride or monomer mixture containing it and the catalyst components dissolved in a common solvent. Any solvent may be employed which does not totally inhibit the polymerisation of the monomers and in which the compound of iron dissolves to produce ferrous ions. Suitable examples include the lower aliphatic alcohols (up to four carbon atoms per molecule) and in particular methyl and ethyl alcohols.

Methyl hydroperoxide is a known compound which is most suitably handled in an aqueous solution owing to its tendency to decompose explosively in the pure liquid state. However, aqueous solutions of the compound up to at least 51% concentration can be handled without difficulty.

When aqueous reaction mixtures are used many inorganic, water-soluble ferrous iron salts can be employed. Examples are ferrous sulphate, ferrous ammonium sulphate and ferrous chloride. When a homogeneous reaction mixture is employed, a more limited number of ferrous salts are available. If the reaction mixture comprises a lower aliphatic alcohol, a particularly suitable ferrous salt is ferrous chloride.

Any form of ascorbic acid can be employed, i.e. the laevo-, the dextro- or the iso-configurations of the 2,3,4, 5,6-pentahydroxyhex-2-enoic acid and the deltalactone produced therefrom.

If desired minor proportions of copolymerisable compounds can be mixed with the vinyl chloride so that copolymers are produced. Examples of such compounds are the monoethylenic compounds having the group $CH_2=C<$ such as vinyl esters, vinyl ethers, vinyl ketones, acrylic and methacrylic acid esters. When vinyl chloride is polymerised on its own a particularly valuable polyvinyl chloride having a high density and high softening point is produced.

The relative proportions of the various ingredients of the reaction mixture can be varied within the usual limits of redox polymerisation systems. The preferred relative concentrations and proportions are as follows:

(1) The vinyl chloride or monomer mixture containing it preferably forms from ⅕ to ½ of the total reaction mixture by volume, but this is not critical. Most suitably the monomeric material is present in an amount corresponding to about ⅓ by volume of the reaction mixture.

(2) The methyl hydroperoxide concentration can be varied considerably, but is most suitably in the range from 0.05 to 0.20% by weight of monomeric material present.

(3) The concentration of ferrous compound is more critical and it is important not to employ too high a concentration thereof. A suitable concentration range for the ferrous compound is 0.001 to 0.02% by weight of the monomeric material present; preferably, and particularly in the case of ferrous chloride, about 0.003% by weight of ferrous compound is used, based on the weight of monomeric material.

(4) The ascorbic acid concentration varies with the concentration of methyl hydroperoxide present and is preferably used in approximately the same molar concentration as the methyl hydroperoxide. A range of suitable molar concentrations is from 0.75 to 3 times the molar concentration of methyl hydroperoxide present.

The polymerisation is carried out under standard conditions for redox polymerisation systems provided that the temperature of polymerisation is maintained within the range $-14$ to $-60°$ C. The components of the catalyst system may be added to the reaction mixture in any order although it is preferred that the methyl hydroperoxide shall be added last. If desired, the polymerisation can be initiated with part of the redox system and the remaining catalyst can be added as the polymerisation proceeds. Alternatively part of the ascorbic acid can be withheld from the reaction mixture and added as polymerisation proceeds. Likewise, the vinyl chloride or monomer mixture containing it can be added in increments to the reaction mixture.

When operating the process of the present invention at the lower end of the temperature range, the products obtained may have exceedingly high molecular weights. It is often desirable to produce polyvinyl chloride having a similar molecular weight to that prepared by conventional polymerisation techniques and consequently the molecular weights of polyvinyl chloride produced according to the present invention can be reduced by carrying out the polymerisation in the presence of a chain transfer agent such as a halogen-containing hydrocarbon, e.g. the bromo and/or chloro methanes, or a mercaptan.

The polymer or copolymers produced according to the process of the present invention can be recovered by conventional means. For example, if an aqueous emulson system has to be employed the polymer is recovered by coagulation with, for example, methyl or ethyl alcohols or an aqueous solution containing an electrolyte for example brine. The polymer is then separated by filtration, washed well with water and dried at room temperature in vacuum. When a homogenous polymerisation system is used and the polymer is insoluble, it can be recovered by filtration from the reaction mixture followed by washing and drying at room temperature in vacuum.

Polyvinyl chloride produced according to the process of the present invention usually has a softening point above 100° C. By softening point is meant throughout this specification the softening point as measured by the bending beam technique described in British Standard Specification 2782: Part 1: 1956. Conventional polyvinyl chlorides having softening points of about 83° C. In many cases the softening point of polyvinyl chloride according to the present invention is so high that it cannot be measured by this test. In these cases the material can be compounded with 10% by weight of dioctyl phthalate and the softening point of the resultant composition can be measured. When conventional polyvinyl-chloride is compounded in this way the softening point of the resultant composition is about 58.5° C.

The density of polyvinyl chloride produced according to the present invention is greater than 1.403 which is a typical value for conventional material. Samples having densities in the range 1.406 to 1.424 have been produced. It is found that polyvinyl chloride produced according to the present invention and having a conventional molecular weight has the highest density. If products having particularly high molecular weights are produced, it is found that their densities are somewhat lower than the densities of lower molecular weight polymers.

The following examples illustrate the process of the present invention.

Examples 1 to 4

The polymerisation of vinyl chloride was carried out in aqueous emulson using a reaction medium consisting of water and methyl alcohol and a 30% w./v. aqueous solution, of a mixture of higher ($C_{10}$—$C_{18}$) mono alkyl sulphates, sold under the trade name of "Teepol," as the emulsifying agent. The remaining ingredients employed are shown in the following table together with the results obtained. The polymerisations were allowed to proceed for between 3½ and 20 hours.

|  | 1 | 2 | 3 | 4 |
|---|---|---|---|---|
| Vinyl Chloride, grams | 200 | 200 | 200 | 200 |
| Water, millilitres | 400 | 400 | 400 | 400 |
| MeOH, millilitres | 225 | 225 | 225 | 225 |
| Emulsifying agent, millilitres | 7.5 | 7.5 | 7.5 | 7.5 |
| Ferrous chloride grams | 0.008 | 0.008 | 0 008 | 0.008 |
| Ascorbic acid grams | 0.34 | 0.44 | 0.175 | 0.44 |
| Methyl hydroxoperoxide, grams 51% w./w. in water | 0.24 | 0.30 | 0.12 | 0.30 |
| Temp., ° C | −15 | −14 | −20 | −18 |
| Time, hours | 3.5 | 20 | 4 | 20 |
| Conversion, percent | 75 | 75 | 65 | 80 |
| Viscosity[1] | 0.70 | 0.63 | 1.11 | 0.34 |
| t-Dodecyl mercaptan, grams |  |  |  | 2.0 |
| Density at 20° C | 1.406 | 1.405 | 1.410 | 1.409 |
| Softening Point, ° C | 105 | 109 | 102 | 106 |

[1] The viscosity of a solution of the polyvinyl chloride in cyclohexanone at 25° C. gives an indication of the molecular weight thereof. They are expressed as specific viscosities of 0.25% w./v. solutions. Such solutions can only be prepared easily by the previous heating of the polyvinyl chloride in the solvent at temperatures of the order of 100° C. The viscosity of a solution of a conventional polyvinyl chloride prepared at elevated temperatures, is of the order of 0.30.

Examples 5 to 7

The procedure of Examples 1 to 4 was repeated but the vinyl chloride was replaced with mixtures of vinyl chloride and lauryl methacrylate. The other ingredients of the polymerisation reaction medium and the results obtained are shown in the following table

|  | 5 | 6 | 7 |
|---|---|---|---|
| Vinyl Chloride, grams | 200 | 200 | 200 |
| Lauryl methacrylate, grams | 5 | 10 | 50 |
| Water millilitres | 400 | 400 | 400 |
| MeOH, millilitres | 225 | 225 | 225 |
| Emulsifying agent, millilitres | 7.5 | 7.5 | 7.5 |
| Ferrous chloride, grams | 0.008 | 0.008 | 0.008 |
| Ascorbic acid, grams | 0.44 | 0.44 | 0.44 |
| Methyl hydroperoxide, grams 51% w./w. in water | 0.30 | 0.30 | 0.30 |
| Temp., ° C | −13 | −11 | −16 |
| Time, hours | 20 | 19 | 19 |
| Conversion, percent | 88 | 75 | 65 |
| Viscosity | 0.24 | 0.21 | 0.30 |
| t-Dodecyl mercaptan, grams | 2.05 | 2.0 |  |
| Softening point, ° C | 86.0 | 78.0 | 48.0 |
| Percent lauryl methacrylate units in copolymer | 3.7 | 4.4 | 28.0 |

We claim:

1. A process which comprises polymerising vinyl chloride at a temperature in the range −14° C. to −60° C. in the presence of a redox polymerisation catalyst consisting essentially of methyl hydroperoxide, a compound of iron capable of producing ferrous ions in the reaction medium and ascorbic acid.

2. A process as claimed in claim 1, wherein the polymerisation is carried out in an aqueous medium containing an antifreeze ingredient to prevent the reaction mixture freezing.

3. A process as claimed in claim 1, wherein the polymerisation is carried out under homogeneous conditions.

4. A process as claimed in claim 3 wherein the reaction mixture comprises a lower aliphatic alcohol and the iron compound is ferrous chloride.

5. A process as claimed in claim 1, wherein the monomeric material amounts to about ⅓ by volume of the reaction mixture.

6. A process as claimed in claim 1, wherein the concentration of the methyl hydroperoxide is in the range 0.05 to 0.20% by weight of the monomeric material present.

7. A process as claimed in claim 1, wherein the concentration of ferrous compound is 0.001 to 0.02% by weight of the monomeric material present.

8. A process as claimed in claim 1, wherein the molar concentration of the ascorbic acid is from 0.75 to 3 times the molar concentration of the methyl hydroperoxide.

9. A process as claimed in claim 1, wherein the polymerisation is carried out in the presence of a chain transfer agent.

References Cited in the file of this patent

UNITED STATES PATENTS

| 2,609,366 | Fryling et al. | Sept. 2, 1952 |
| 2,684,357 | Troyan et al. | July 20, 1954 |
| 2,776,953 | Taves | Jan. 8, 1957 |
| 2,776,954 | Taves | Jan. 8, 1957 |
| 2,895,919 | Gerhart | July 21, 1959 |
| 2,938,000 | Wanless et al. | May 24, 1960 |
| 2,996,490 | Roland et al. | Aug. 15, 1961 |
| 3,022,282 | Marous et al. | Feb. 20, 1962 |

OTHER REFERENCES

Tobolsky et al.: "Organic Peroxides," page 158 (Interscience 1954).